(12) United States Patent
Jiang

(10) Patent No.: US 8,081,230 B2
(45) Date of Patent: Dec. 20, 2011

(54) IMAGE CAPTURING DEVICE CAPABLE OF GUIDING USER TO CAPTURE IMAGE COMPRISING HIMSELF AND GUIDING METHOD THEREOF

(75) Inventor: Jin-Lin Jiang, Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 426 days.

(21) Appl. No.: 12/331,440

(22) Filed: Dec. 10, 2008

(65) Prior Publication Data

US 2010/0026872 A1 Feb. 4, 2010

(30) Foreign Application Priority Data

Aug. 1, 2008 (CN) .......................... 2008 1 0303312

(51) Int. Cl.
*H04N 5/228* (2006.01)
(52) U.S. Cl. .................................................... 348/222.1
(58) Field of Classification Search ................ 348/222.1
See application file for complete search history.

(56) References Cited

U.S. PATENT DOCUMENTS

| | | | |
|---|---|---|---|
| 7,317,485 B1 * | 1/2008 | Miyake et al. | 348/333.02 |
| 2008/0239104 A1 * | 10/2008 | Koh | 348/240.99 |
| 2008/0273097 A1 * | 11/2008 | Nagashima | 348/231.99 |

* cited by examiner

*Primary Examiner* — James Hannett
(74) *Attorney, Agent, or Firm* — Altis Law Group, Inc.

(57) ABSTRACT

An image capturing device includes a memory, a communication unit, and a processor. The memory stores a guiding system configured for guiding a user to capture an image including himself. The processor is configured for activating the system to: perform a facial recognition function on a current checking image to determine a face portion in the checking image, determine if the face portion is fully within a predetermined region of the checking image, and control the communication unit to instruct the user to adjust position of the image capturing device according to the position of the face portion in relation to the predetermined region upon the condition that the face portion is not fully within the predetermined region.

16 Claims, 14 Drawing Sheets

IMAGE CAPTURING DEVICE CAPABLE OF GUIDING USER TO CAPTURE IMAGE COMPRISING HIMSELF AND GUIDING METHOD THEREOF

BACKGROUND

1. Technical Field

The present disclosure relates to an image capturing device capable of guiding a user to capture an image that include himself and a guiding method thereof.

2. Description of the Related Art

Image capturing devices, such as digital still cameras and camcorders, typically include a lens installed in the front part thereof to acquire front vision and a viewfinder installed on the rear part thereof for a user to determine the view range. Such an arrangement makes it difficult for users to capture quality self-portraits or group photos that include themselves in the captured images, since once the user joins the scene to be captured they can no longer see the viewfinder to ensure people are properly positioned in the scene.

What is needed, therefore, is to provide an image capturing device capable of guiding a user to capture an image comprising himself and a guiding method thereof, in which the above problem is eliminated or at least alleviated.

DETAILED DESCRIPTION OF THE EMBODIMENTS

Figure 1:
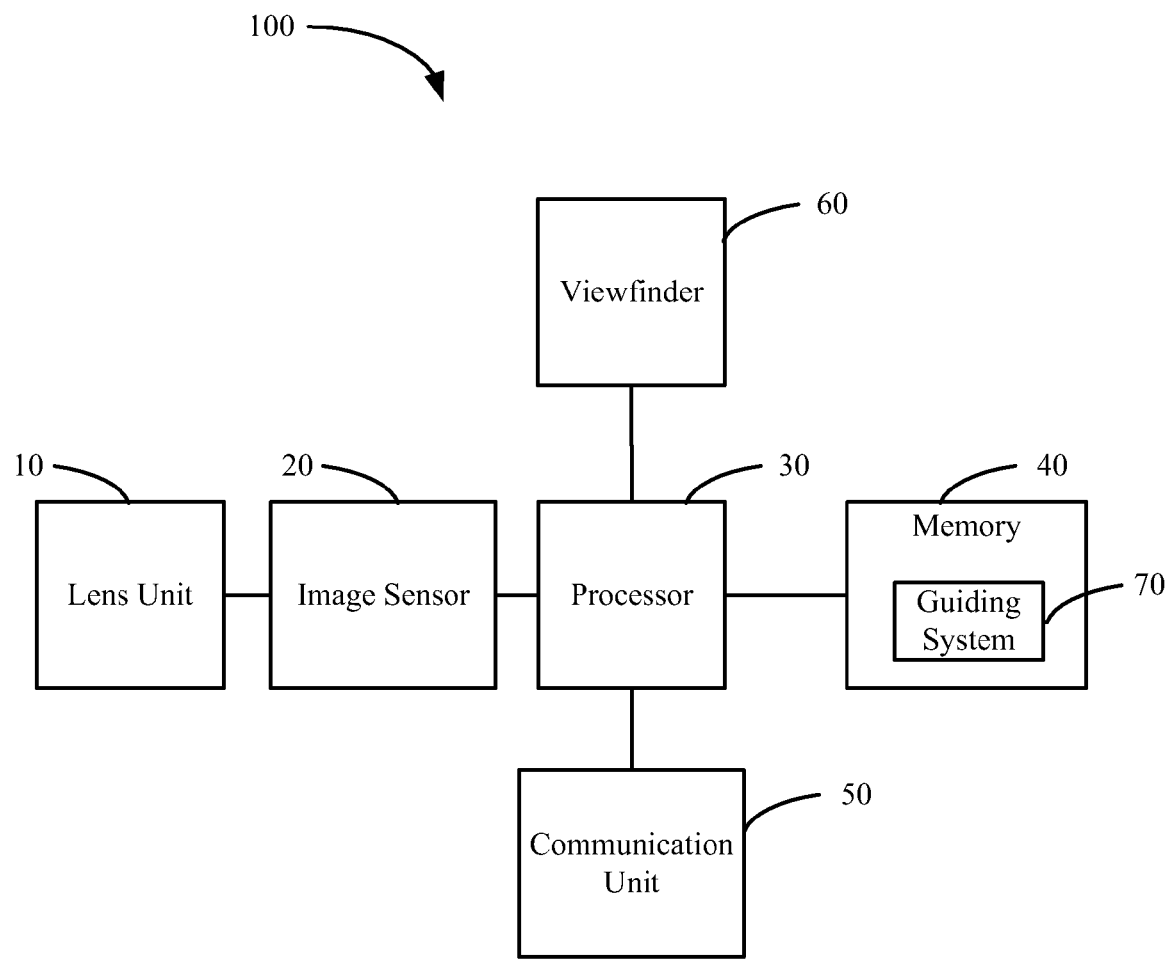
FIG. 1 is a functional block diagram of an image capturing device including a viewfinder according to an exemplary embodiment.
Figure 2:
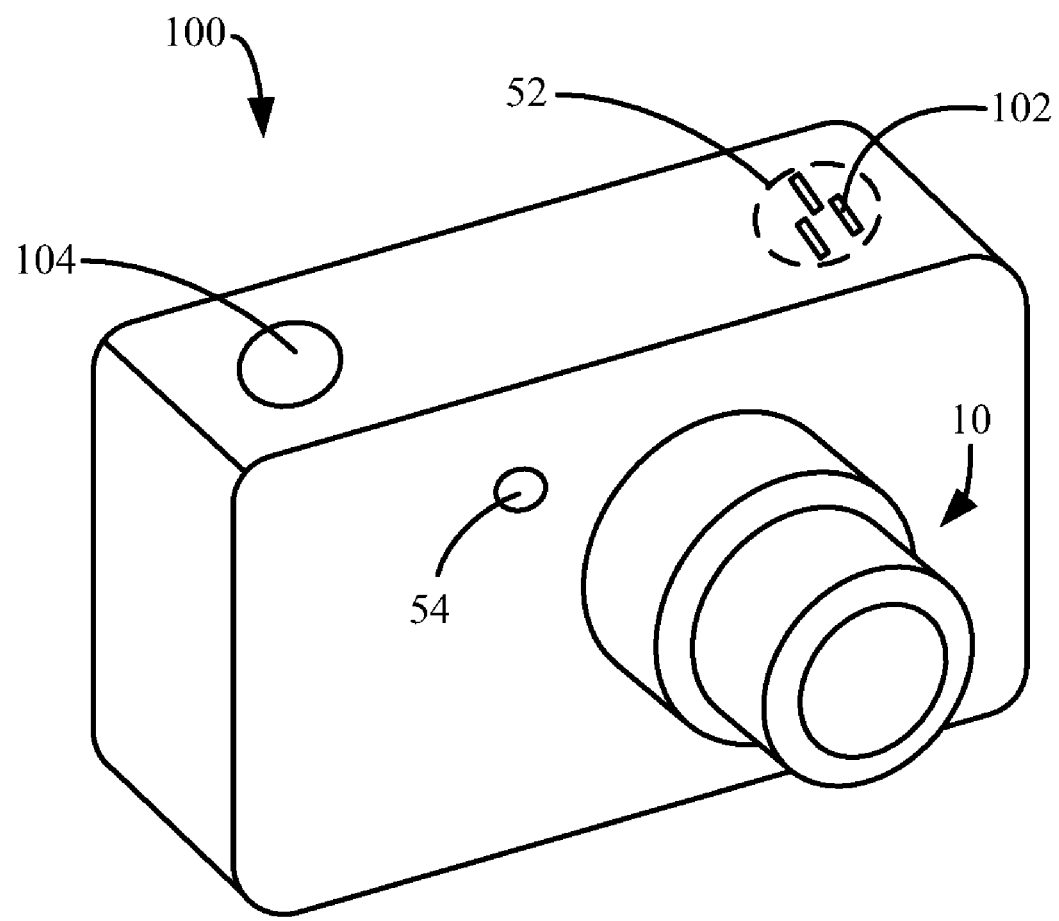
FIG. 2 is a schematic, isometric view of the image capturing device of FIG. 1.
Figure 3:
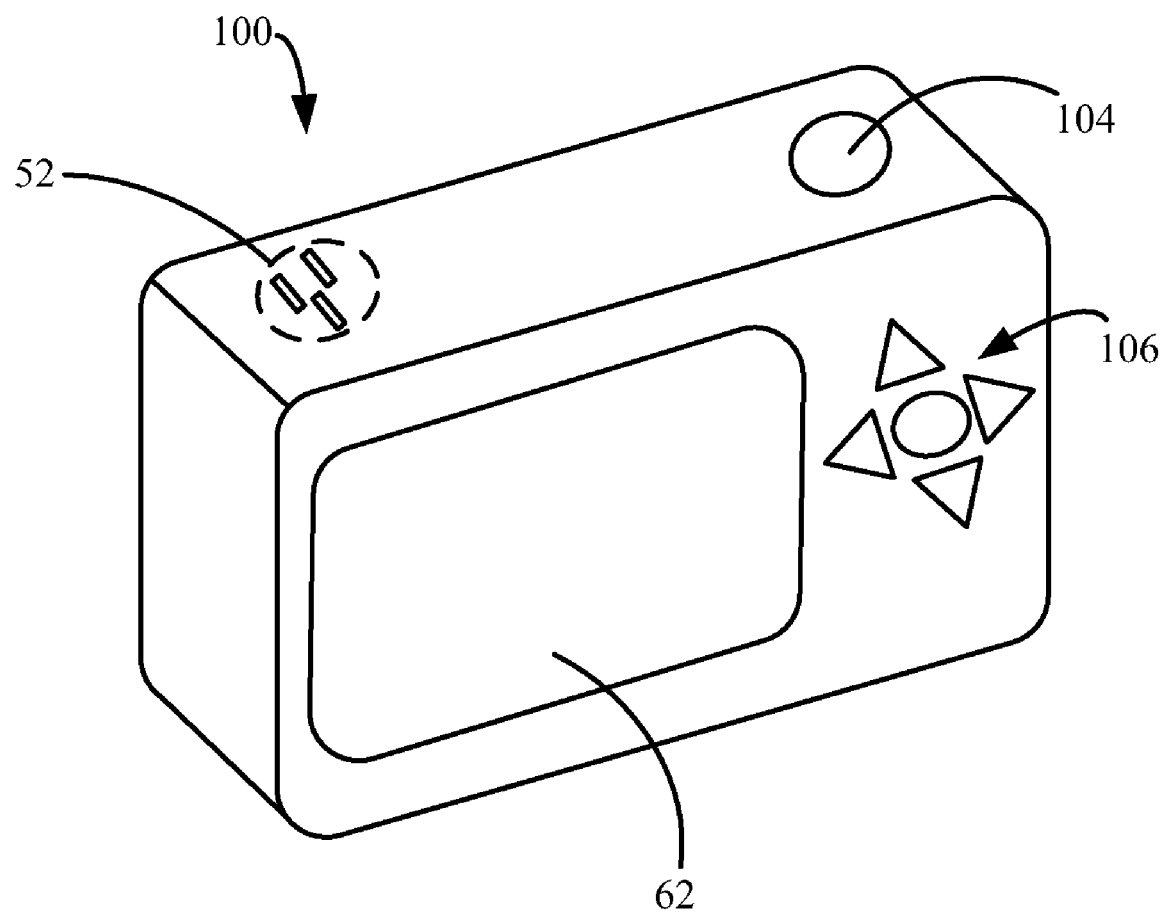
FIG. 3 is another schematic, isometric view of the image capturing device of FIG. 1, viewed from another angle.

Referring to FIGS. 1-3, an image capturing device 100 such as a digital camera 100 according to an embodiment includes a lens unit 10, an image sensor 20, a processor 30, a memory 40, a communication unit 50, and a viewfinder 60. The memory 40 stores a guiding system 70 configured for guiding a user to capture an image comprising himself, and a first group of boundary coordinates D according to a predetermined coordinate system. The coordinates D defining a region 10d (shown in FIG. 4), predetermined by manufacturer or user depending on embodiments, within which the user's face should be in the image to attain a quality self-portrait. The image is formed by the image sensor 20. The lens unit 10 may be an optical-zoom lens unit. The viewfinder 60 includes a screen 62. The communication unit 50 may include a speaker 52 and an array of colored LEDs 54.

The processor 30 is configured for activating the system 70 to perform a facial recognition function on a current checking image, to determine a face portion 10c (shown in FIG. 6) in the current checking image, determine if the face portion 10c is fully within the predetermined region 10d (shown in FIG. 4) of the current checking image, and control the communication unit 50 to instruct the user to adjust position of the camera 100, if needed, according to the position of the face portion 10c in relation to the predetermined region 10d. The facial recognition function may be performed in a typical way known in the art. The checking image is captured by the image sensor 20 before a final image is captured. The face portion 10c and the predetermined region 10d may each be rectangular shaped. The predetermined region 10d may include four corners $d_1, d_2, d_3, d_4$, and four sides: a first side $d_1 d_4$, a second side $d_2 d_3$ parallel to the first side $d_1 d_4$, a third side $d_1 d_2$ perpendicularly connecting the first side $d_1 d_4$ to the second side $d_2 d_3$ and a fourth side $d_4 d_3$ perpendicularly connecting the first side $d_1 d_4$ to the second side $d_2 d_3$. The processor 30 is configured for controlling the screen 62 to display the face portion 10c and the predetermined region 10d. The first group of coordinates D includes four coordinates $d_1(x_{d1}, y_{d1}), d_2(x_{d2}, y_{d2}), d_3(x_{d3}, y_{d3}), d_4(x_{d4}, y_{d4})$ corresponding to the four corners $d_1, d_2, d_3, d_4$ of the predetermined region 10d. The length of the predetermined region 10d is $(x_{d2}-x_{d1})$, and the width of the predetermined region 10d is $(y_{d1}-y_{d4})$.

Figure 5:
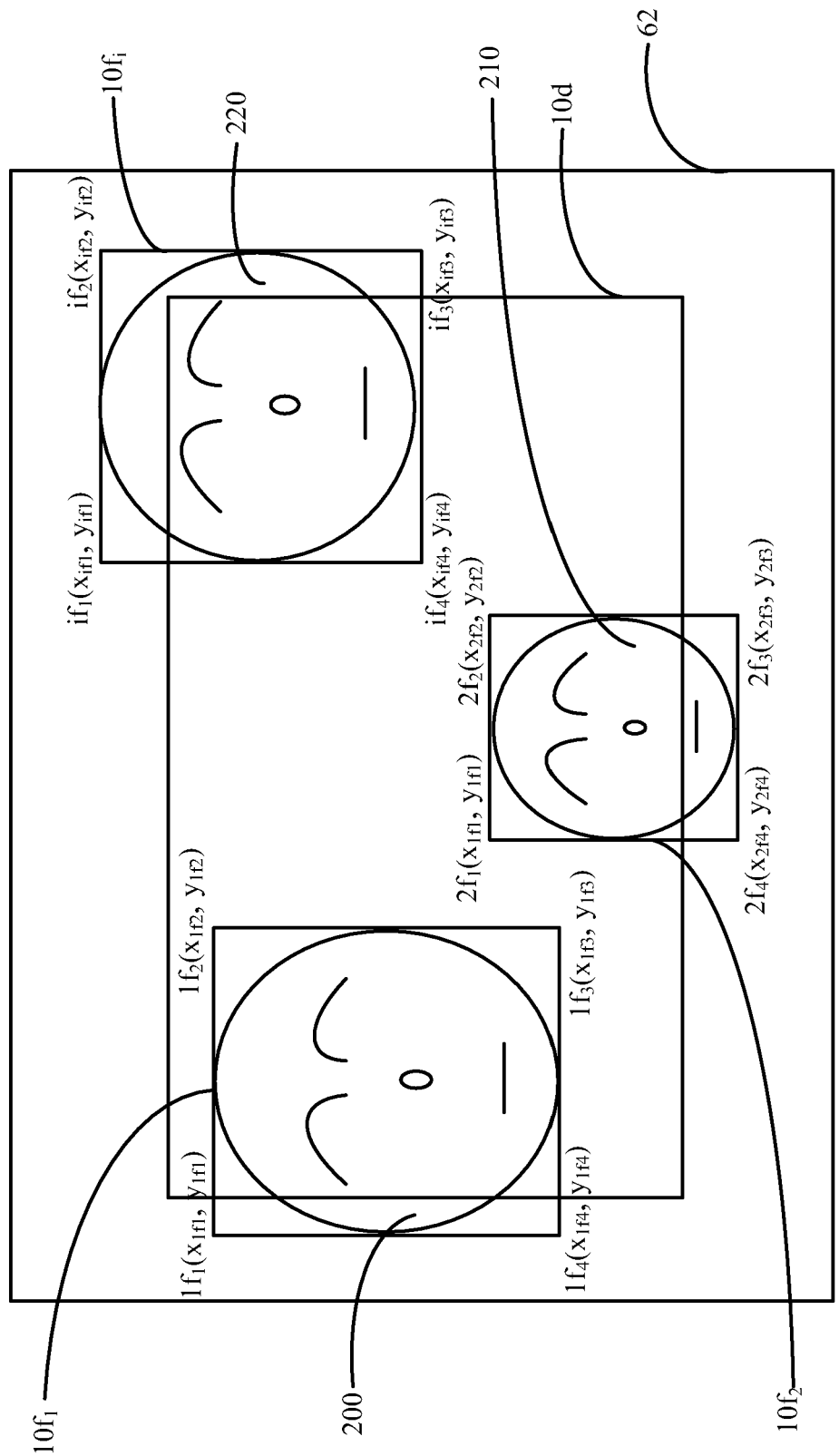
FIG. 5 is similar to FIG. 4, but further showing a plurality of sub-face portions displayed on the screen of the image capturing device of FIG. 3.

Referring to FIG. 5, a user may be attempting to take a picture of himself and two others, in which case the checking image should include a plurality of faces 200, 210, and 220. In this embodiment, the user is holding the camera 100 out away from his body and pointing the camera 100 at himself and the two others. In other embodiments, the user may use a tripod or some surface to support the camera 100. When the processor 30 activates the system 70 to perform a facial recognition function on the checking image, to determine the face portion 10c, the processor 30 determines a number of sub-face portions $10f_1, 10f_2, \ldots, 10f_i$, where i is a natural number and is equal to the number of the faces. For example, each sub-face portion $10f_i$ may be rectangular shaped and frame a face. The sub-face portion $10f_i$ includes four corners $if_1, if_2, if_3, if_4$. A second group of coordinates iF may be determined by the processor 30 in the predetermined coordinate system according to positions of the faces recognized in the image. The second group of coordinates iF includes four coordinates $if_1(x_{if1}, y_{if1}), if_2(x_{if2}, y_{if2}), if_3(x_{if3}, y_{if3}), if_4(x_{if4}, y_{if4})$ corresponding to the four corners $if_1, if_2, if_3, if_4$ of the sub-face portion $10f_i$. The face portion $10c$ is determined according the second group of coordinates iF containing all sub-face portions $10f_1$ $10f_2$ ... $10f_i$.

Figure 6:
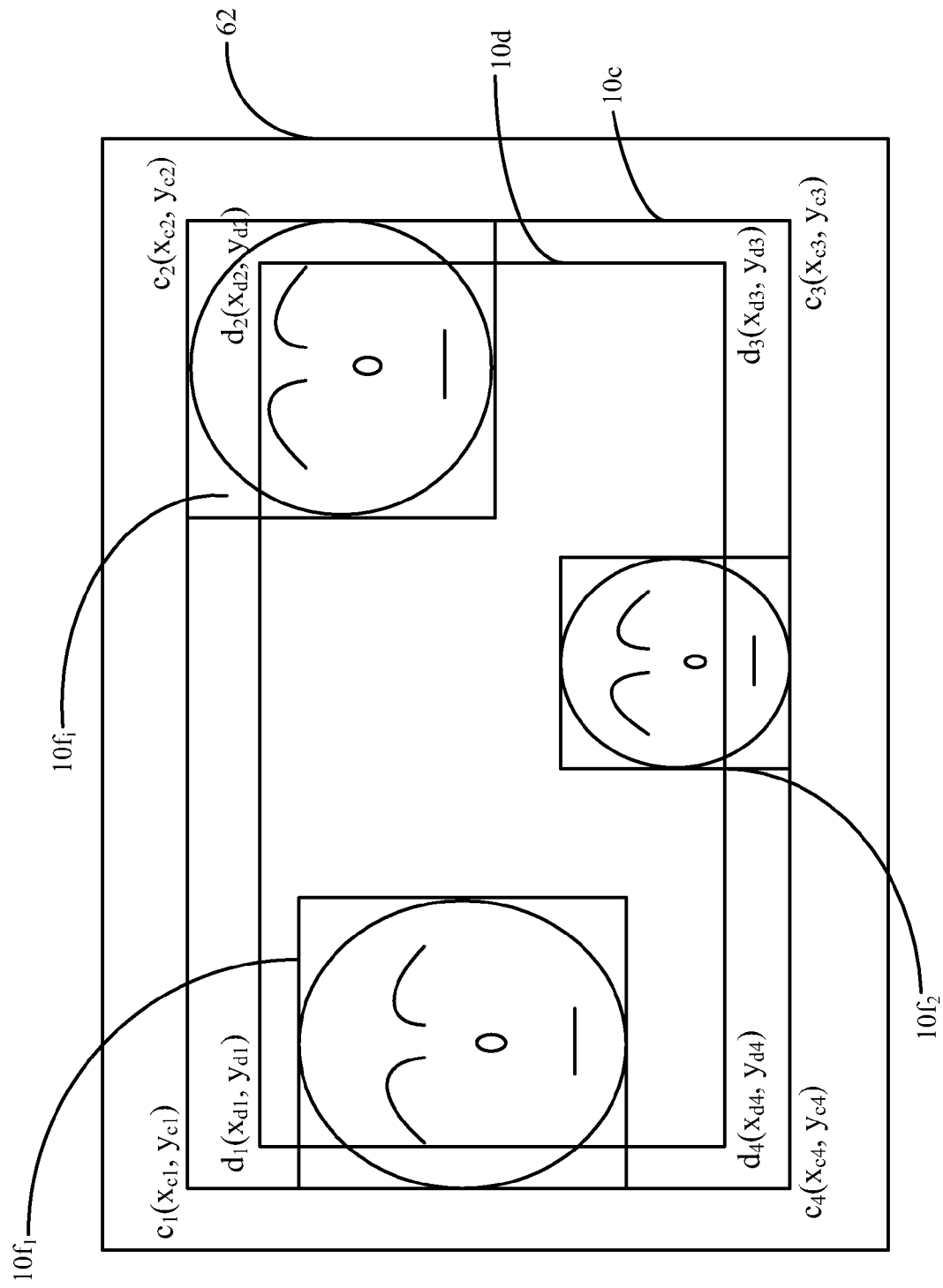
FIG. 6 is similar to FIG. 5, but further showing a first position of a face portion in relation to the predetermined region displayed on the screen of the image capturing device of FIG 3.

Referring to FIGS. 5 and 6, specifically, the face portion $10c$ displayed on the screen 62 includes four corners $c_1, c_2, c_3, c_4$. Coordinates C of the four corners $c_1, c_2, c_3, c_4$ are correspondingly represented as four coordinates $c_1(x_{c1}, y_{c1})$, $c_2(x_{c2}, y_{c2})$, $c_3(x_{c3}, y_{c3})$, $c_4(x_{c4}, y_{c4})$. Accordingly, the coordinate $x_{c1}$ is the minimal value of the coordinates $x_{1f1}, x_{2f1}, \ldots,$ and $x_{if1}$, and the coordinate $y_{c1}$ is the maximal value of the coordinates $y_{1f1}, y_{2f1}, \ldots,$ and $y_{if1}$. The coordinate $x_{c2}$ is the maximal value of the coordinates $x_{1f2}, x_{2f2}, \ldots,$ and $x_{if2}$, and the coordinate $y_{c2}$ is the coordinates $y_{c1}$. The coordinate $x_{c3}$ is the coordinate $x_{c2}$, and the coordinate $y_{c3}$ is the minimal value of the coordinates $y_{1f3}, y_{2f3}, \ldots,$ and $y_{if3}$. The coordinate $x_{c4}$ is the coordinate $x_{c1}$, and the coordinate $y_{c4}$ is the coordinate $y_{c3}$. The length of the face-locking frame $10c$ is $(x_{c2}-x_{c1})$, and the width of the face-locking frame $10c$ is $(y_{c1}-y_{c4})$.

The processor 30 determines if the face portion $10c$ is fully within the predetermined region $10d$ by continually determining and comparing the second group of coordinates with the first group of coordinates.

Referring to FIG. 6 together with FIGS. 2 and 3, when the area of the face portion $10c$ is greater than or equal to the area of the predetermined region $10d$, in this embodiment, that is $(y_{c1}-y_{c4}) \geq (y_{d1}-y_{d4})$ and $(x_{c2}-x_{c1}) \geq (x_{d2}-x_{d1})$, the processor 30 controls the communication unit 50 to instruct the user by sending out a first message using the speaker 52, such as an audible message "move back." The sound may be emitted from some through holes 102 defined in the camera 100. The "move back" message means that the user should move the camera 100 away from the user when the lens unit 10 faces the user. The communication unit 50 continues sending out the "move back" message until $(y_{c1}-y_{c4}) < (y_{d1}-y_{d4})$ and $(x_{c2}-x_{c1}) < (x_{d2}-x_{d1})$.

Figure 7:
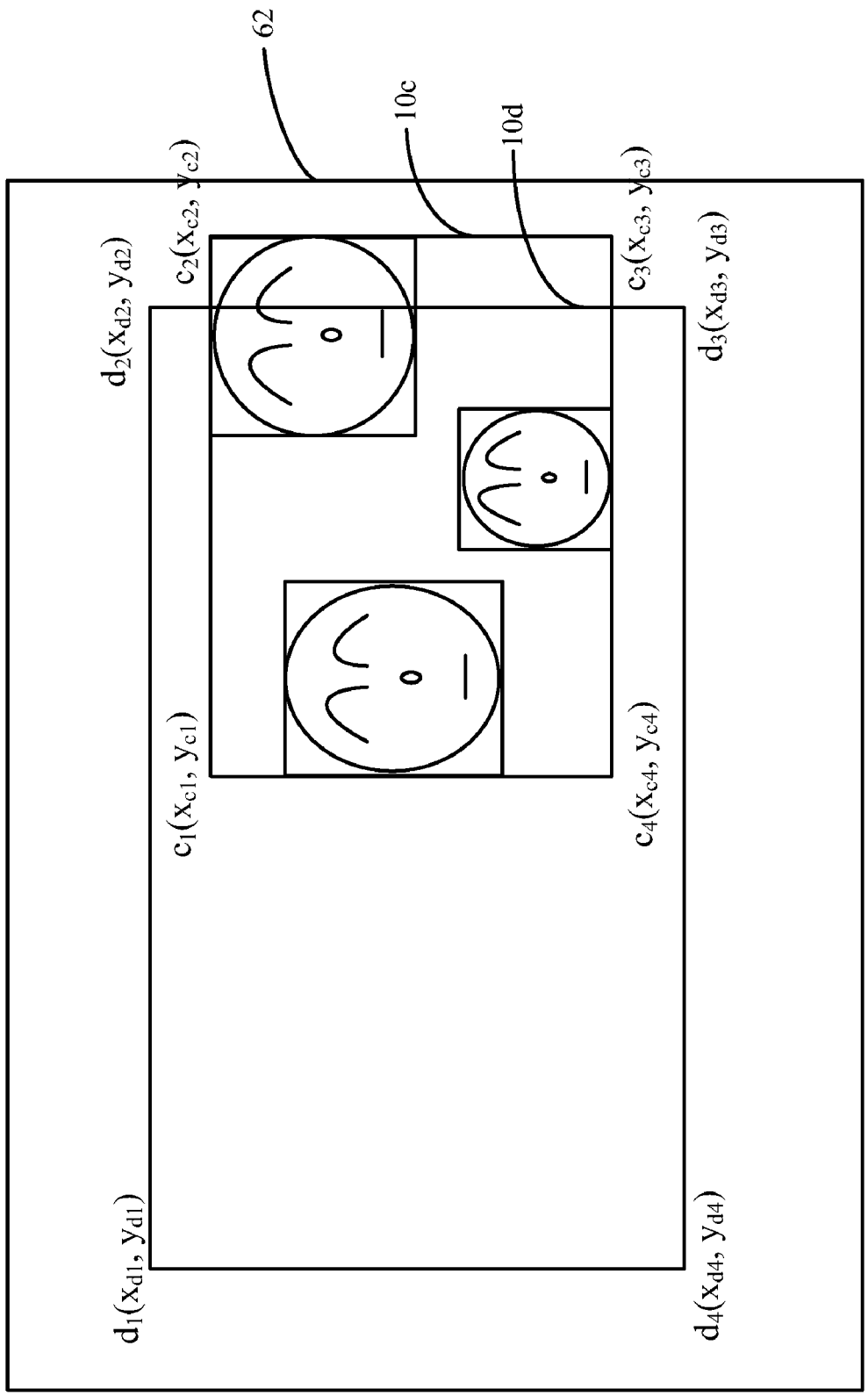
FIG. 7 is similar to FIG. 6, but showing a second position of the face portion in relation to the predetermined image displayed on the screen of the image capturing device of FIG 3.

Referring to FIG. 7 together with FIGS. 2 and 3, when the area of the face portion $10c$ is smaller than the area of the predetermined region $10d$, and the face portion $10c$ partially overlaps with the second side $d_2d_3$, in this embodiment, that is $(y_{c1}-y_{c4}) < (y_{d1}-y_{d4})$ and $(x_{c2}-x_{c1}) < (x_{d2}-x_{d1})$ and $x_{c2} > x_{d2}$, the processor 30 controls the communication unit 50 to instruct the user by sending out a second message using the speaker 52, such as an audible message "move left." The "move left" message means that the user should move the camera 100 towards the left-hand side of the user when the lens unit 10 faces the user. The communication unit 50 continues sending out the "move left" message until $x_{c2} \leq x_{d2}$.

Figure 8:
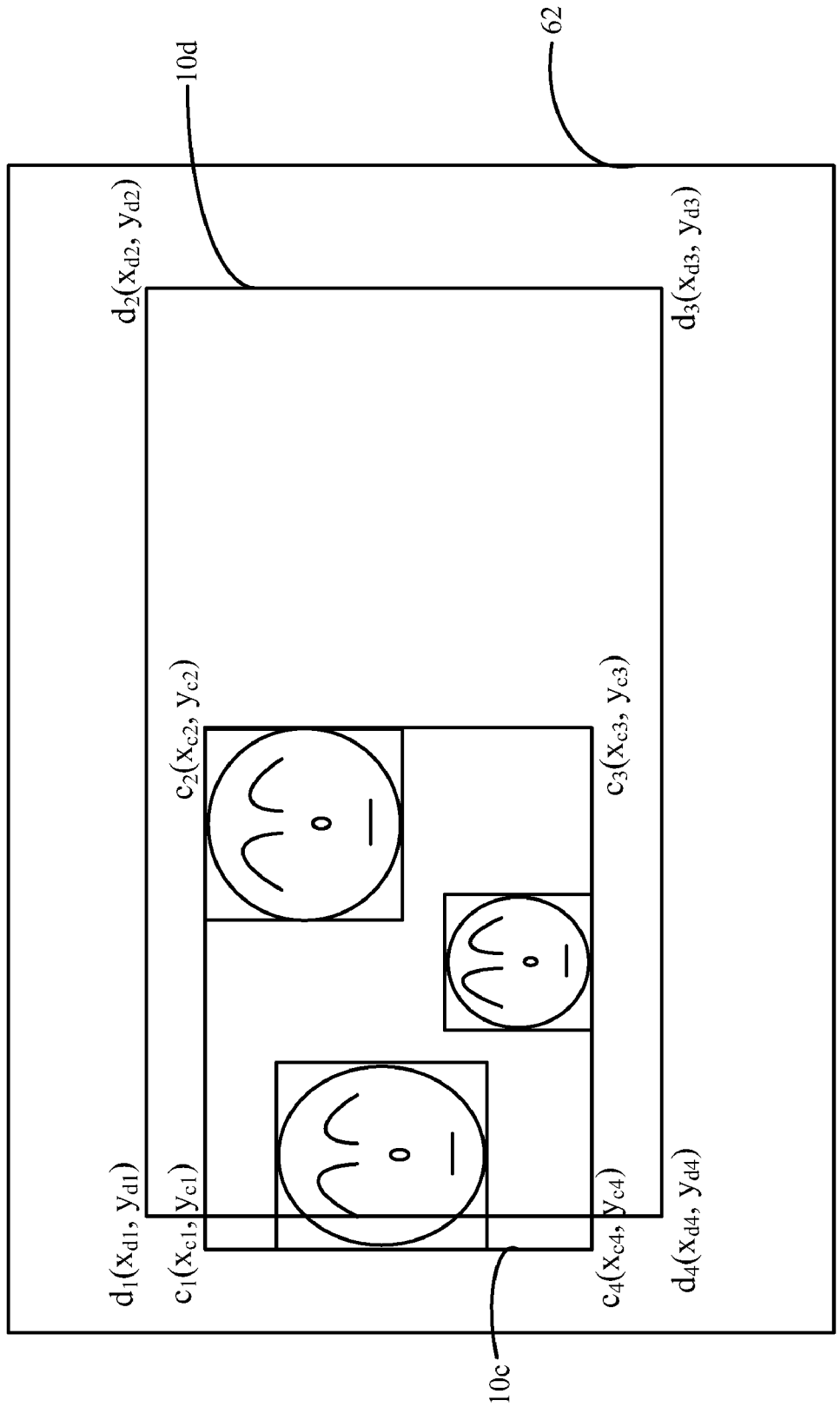
FIG. 8 is similar to FIG. 7, but showing a third position of the face portion in relation to the predetermined region displayed on the screen of the image capturing device of FIG. 3.

Referring to FIG. 8 together with FIGS. 2 and 3, when the area of the face portion $10c$ is smaller than the area of the predetermined region $10d$, and the face portion $10c$ partially overlaps with the first side $d_1d_4$ of the predetermined region $10d$, in this embodiment, that is $(y_{c1}-y_{c4}) < (y_{d1}-y_{d4})$, $(x_{c2}-x_{c1}) < (x_{d2}-x_{d1})$, $x_{c2} < x_{d2}$ and $x_{c1} < x_{d1}$, the processor 30 controls the communication unit 50 to instruct the user by sending out a third message such as an audible message "move right." The "move right" message means that the user should move the camera 100 towards the right-hand side of the user when the lens unit 10 faces the user. The communication unit 50 continues sending out the "move right" message until $x_{c1} \geq x_{d1}$.

Figure 9:
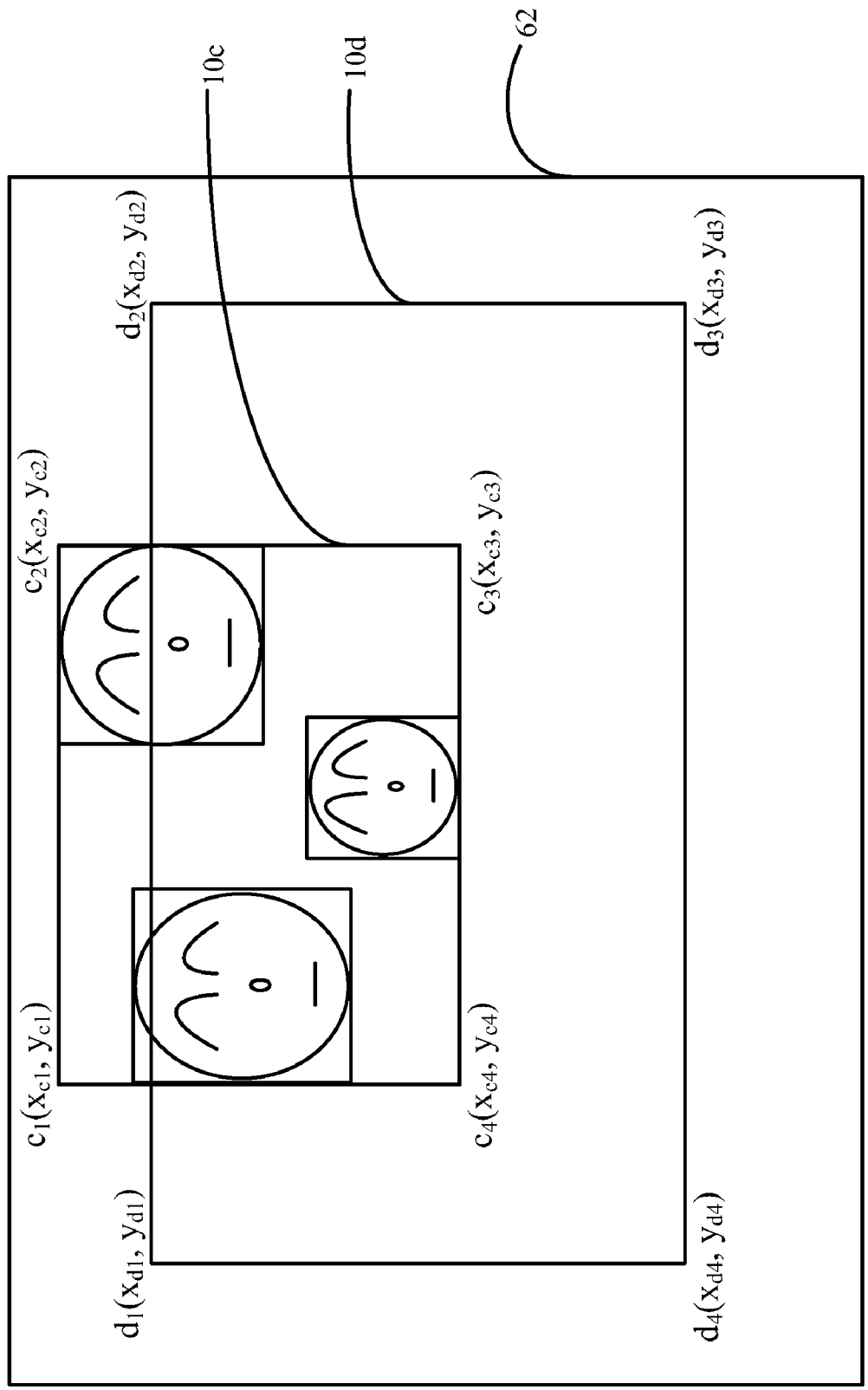
FIG. 9 is similar to FIG. 8, but showing a fourth position of the face portion in relation to the predetermined region displayed on the screen of the image capturing device of FIG 3.

Referring to FIG. 9 together with FIGS. 2 and 3, when the area of the face portion $10c$ is smaller than the area of the predetermined region $10d$, and the face portion $10c$ partially overlaps with the third side $d_1d_2$ of the predetermined region $10d$, in this embodiment, that is $(y_{c1}-y_{c4}) < (y_{d1}-y_{d4})$, $(x_{c2}-x_{c1}) < (x_{d2}-x_{d1})$, $x_{c2} < x_{d2}$, $x_{c1} > x_{d1}$ and $y_{c1} > y_{d1}$, the processor 30 controls the communication unit 50 to instruct the user by sending out a fourth message using the speaker 52, such as an audible message "move up." The "move up" message means that the user should move the camera 100 upwards. The communication unit 50 continues sending out the "move up" message until $y_{c1} \leq y_{d1}$.

Figure 10:
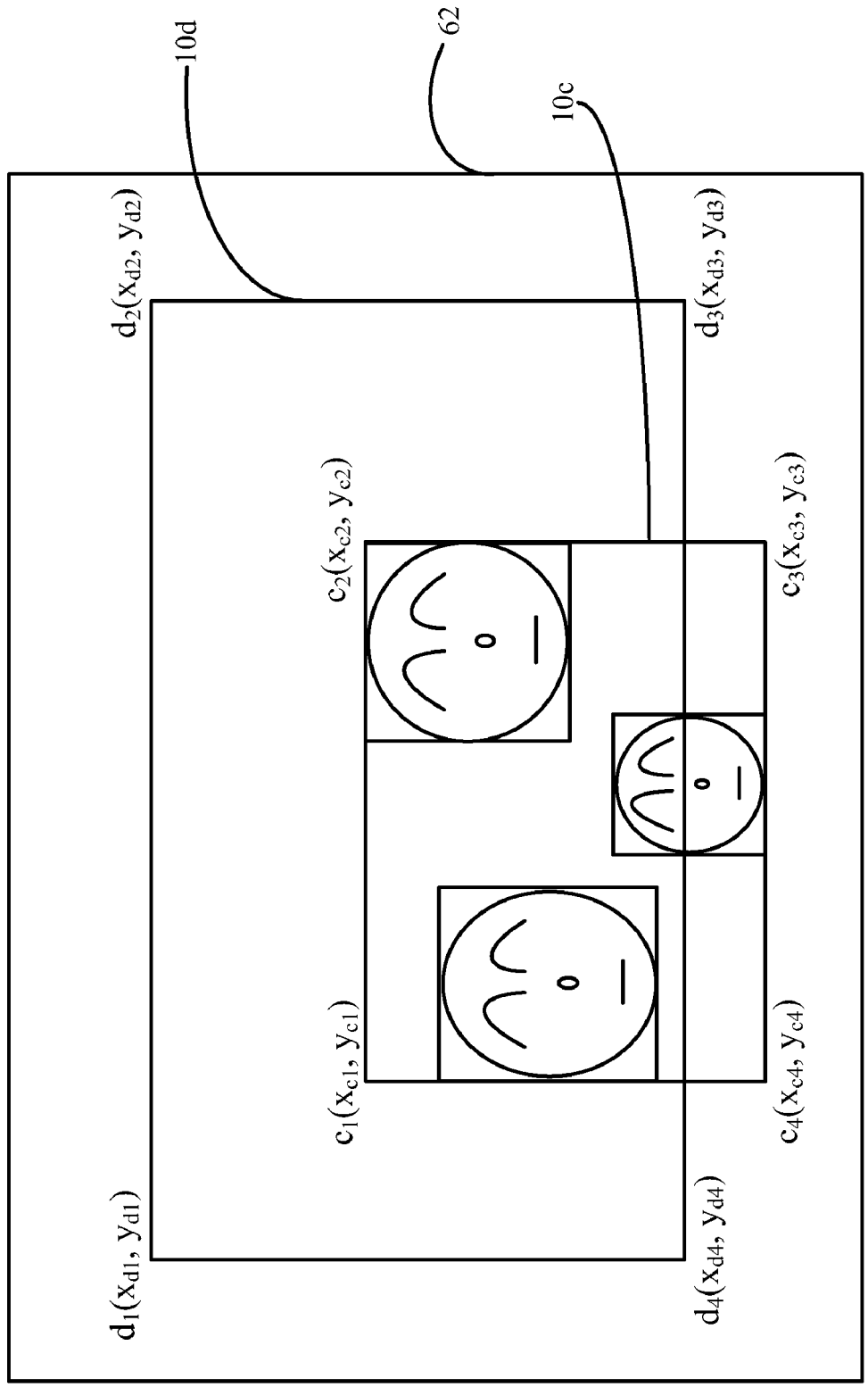
FIG. 10 is similar to FIG. 9, but showing a fifth position of the face portion in relation to the predetermined region displayed on the screen of the image capturing device of FIG. 3.

Referring to FIG. 10 together with FIGS. 2 and 3, when the area of the face portion $10c$ is smaller than the area of the predetermined region $10d$, and the face portion $10c$ overlaps with the fourth side $d_4d_3$ of the predetermined region $10d$, in this embodiment, that is $(y_{c1}-y_{c4}) < (y_{d1}-y_{d4})$, $(x_{c2}-x_{c1}) < (x_{d2}-x_{d1})$, $x_{c2} < x_{d2}$, $x_{c1} > x_{d1}$, $y_{c1} < y_{d1}$ and $y_{c4} < y_{d4}$, the processor 30 controls the communication unit 50 to instruct the user by sending out a fifth message using the speaker 52, such as an audible message "move down." The "move down" message means that the user should move the camera 100 downwards. The communication unit 50 continues sending out the "move down" message until $y_{c4} \geq y_{d4}$.

Figure 11:
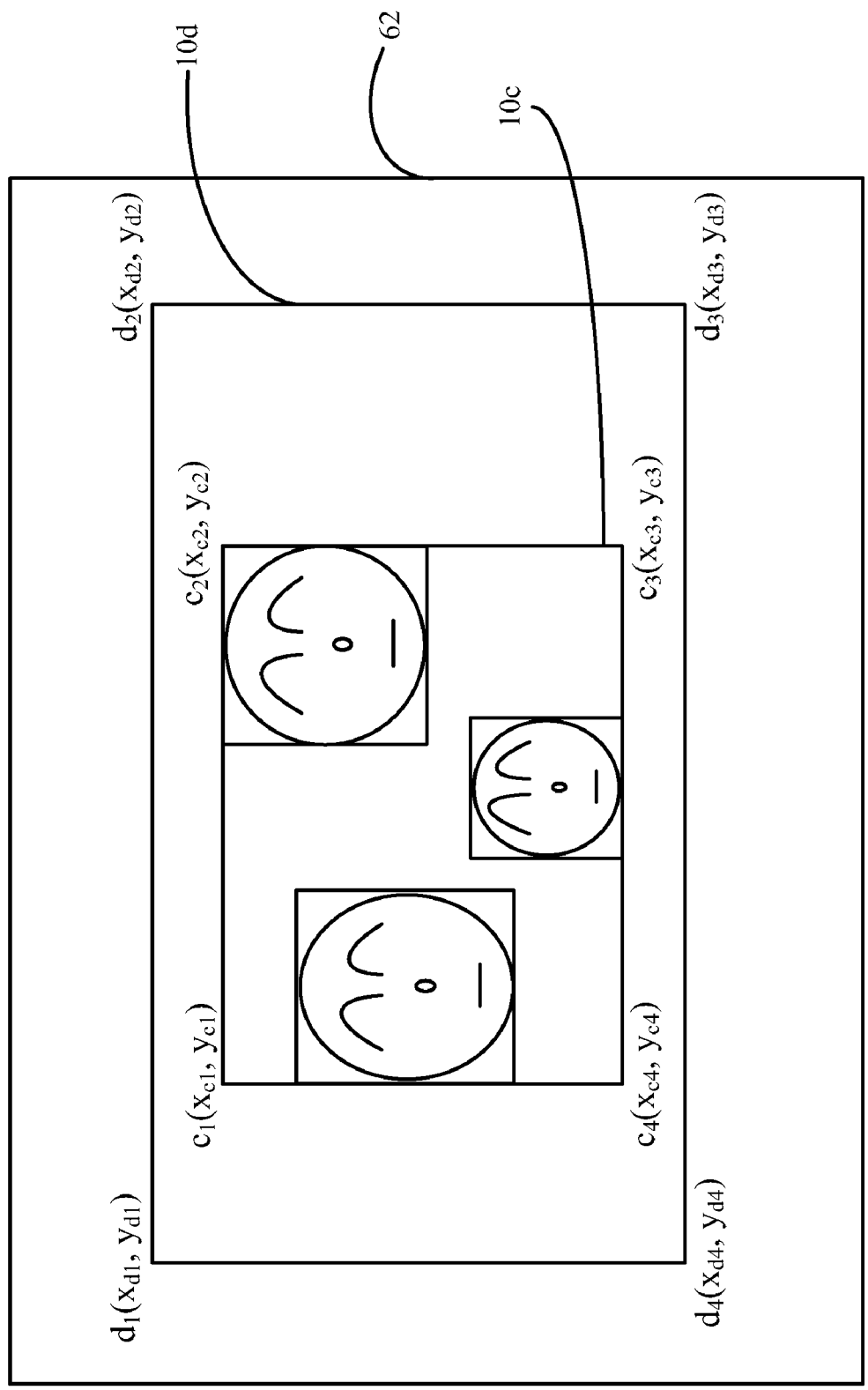
FIG. 11 is similar to FIG. 10, but showing a sixth position of the face portion in relation to the predetermined region displayed on the screen of the image capturing device of FIG. 3.

Referring to FIG. 11 together with FIGS. 2 and 3, after the above movement of the camera 100, the face portion $10c$ is fully within the predetermined region $10d$, the processor 30 controls the communication unit 50 to alert the user by sending out a sixth message using the speaker 52, such as an audible message "OK". Under such condition, the user may proceed to activate a shutter key 104 of the camera 100 thus capturing a quality final image of himself and the two others.

In other embodiment, the communication unit 50 may send out different color light using the array of colored LEDs 54 to guide the user to move the camera 100 in different orientations.

Figure 12:
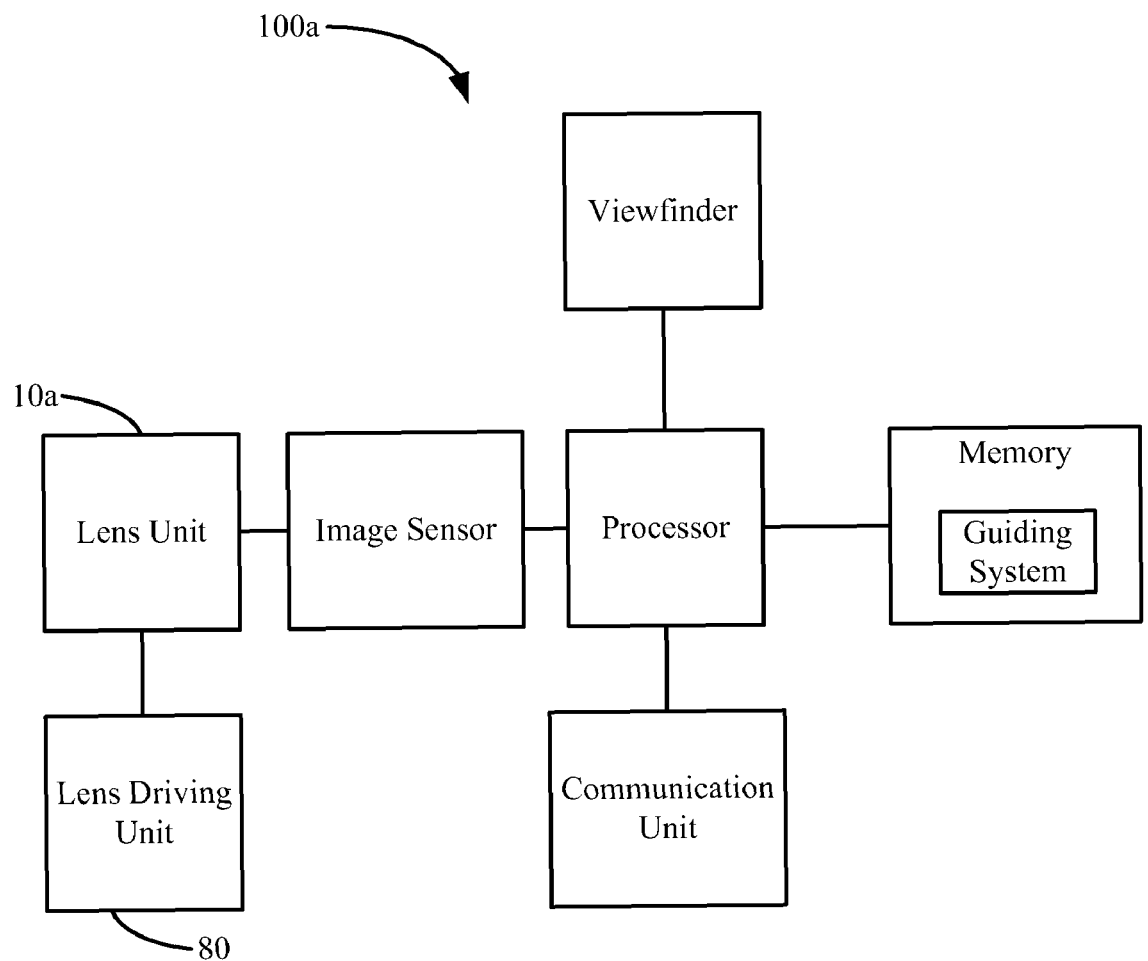
FIG. 12 is a functional block diagram of an image capturing device according to another exemplary embodiment.

Referring to FIG. 12 together with FIGS. 2 and 6, an image capturing device $100a$ according to another embodiment is shown. The difference between the image capturing device $100a$ of this embodiment and the image capturing device 100 is that the image capturing device $100a$ further includes a lens driving unit 80. The lens driving unit 80 is capable of driving the lens unit $10a$ to a wide angle side of the lens unit $10a$. In this way, the face portion $10c$ may be easily fully within the predetermined region $10d$.

Figure 4:
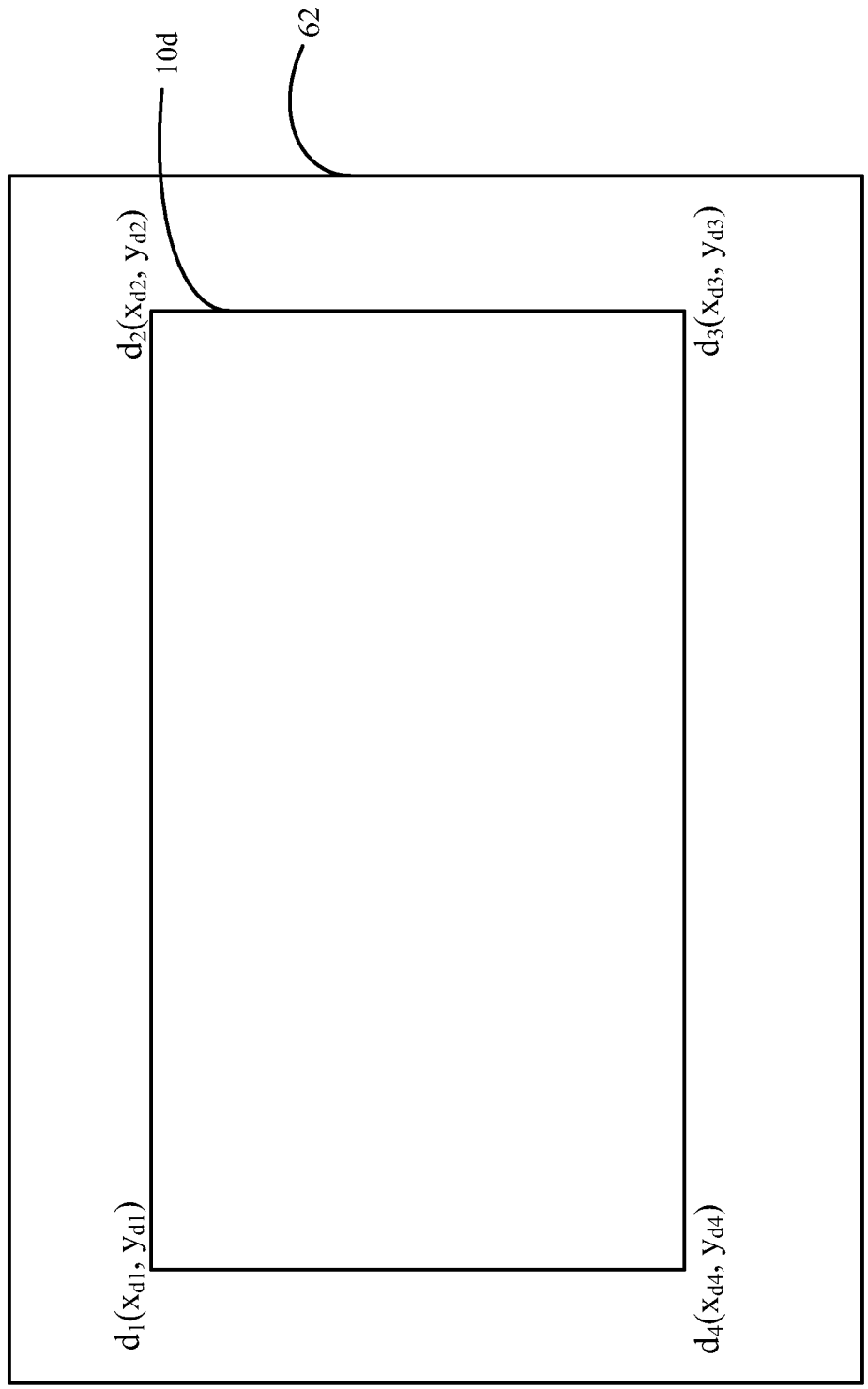
FIG. 4 shows a predetermined region displayed on a screen of the image capturing device of FIG. 3.
Figure 13:
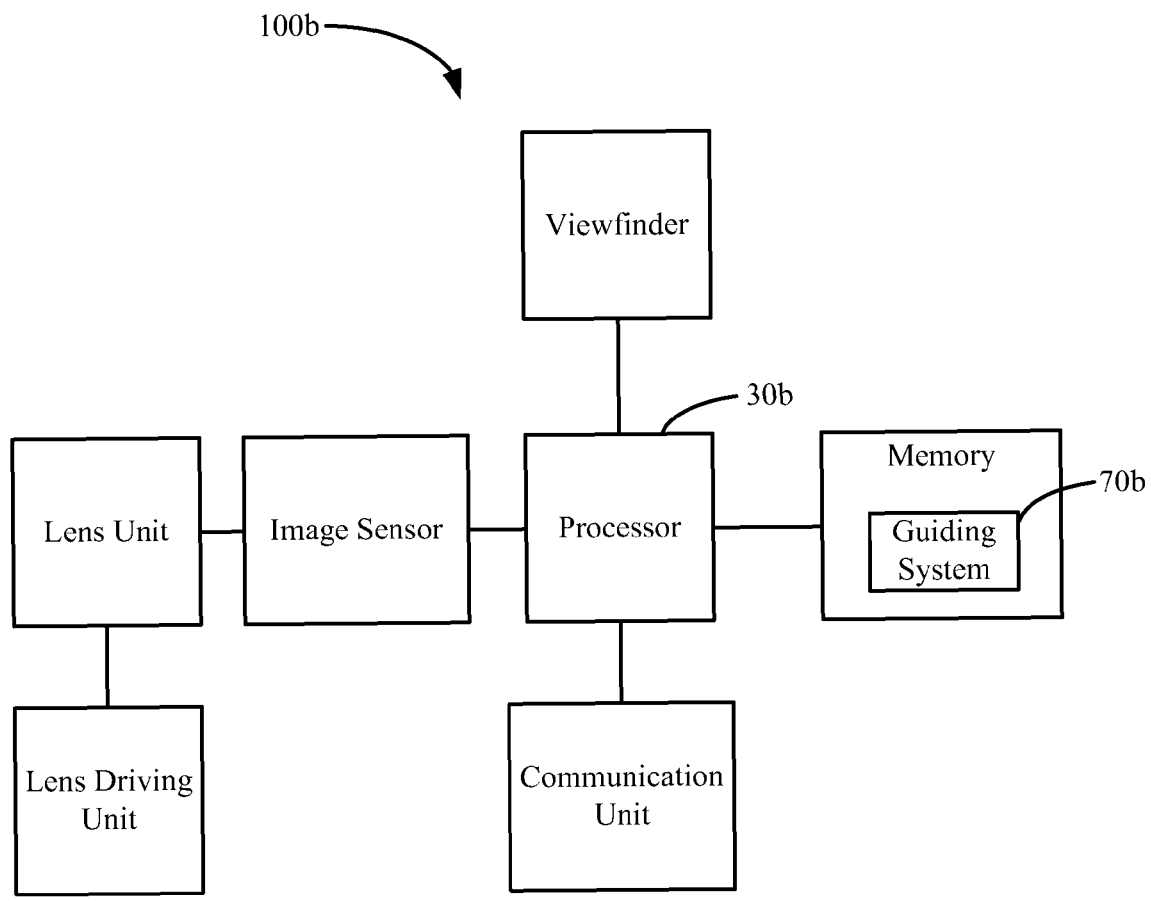
FIG. 13 is a functional block diagram of an image capturing device according to a further exemplary embodiment.

Referring to FIG. 13 together with FIGS. 3 and 4, a image capturing device $100b$ according to a further embodiment is shown. The difference between the image capturing device $100b$ of this embodiment and the image capturing device $100a$ is that the processor $30b$ further activates the guiding system $70b$ to adjust the first group of boundary coordinates D in response to a user's input. Therefore, a size and a displayed position of the predetermined region $10d$ on the screen 62 can be adjusted. The user may input data using some functional keys 106 on the image capturing device $100b$. Therefore, the image capturing device $100b$ can provide a flexible operation for the user.

Figure 14:
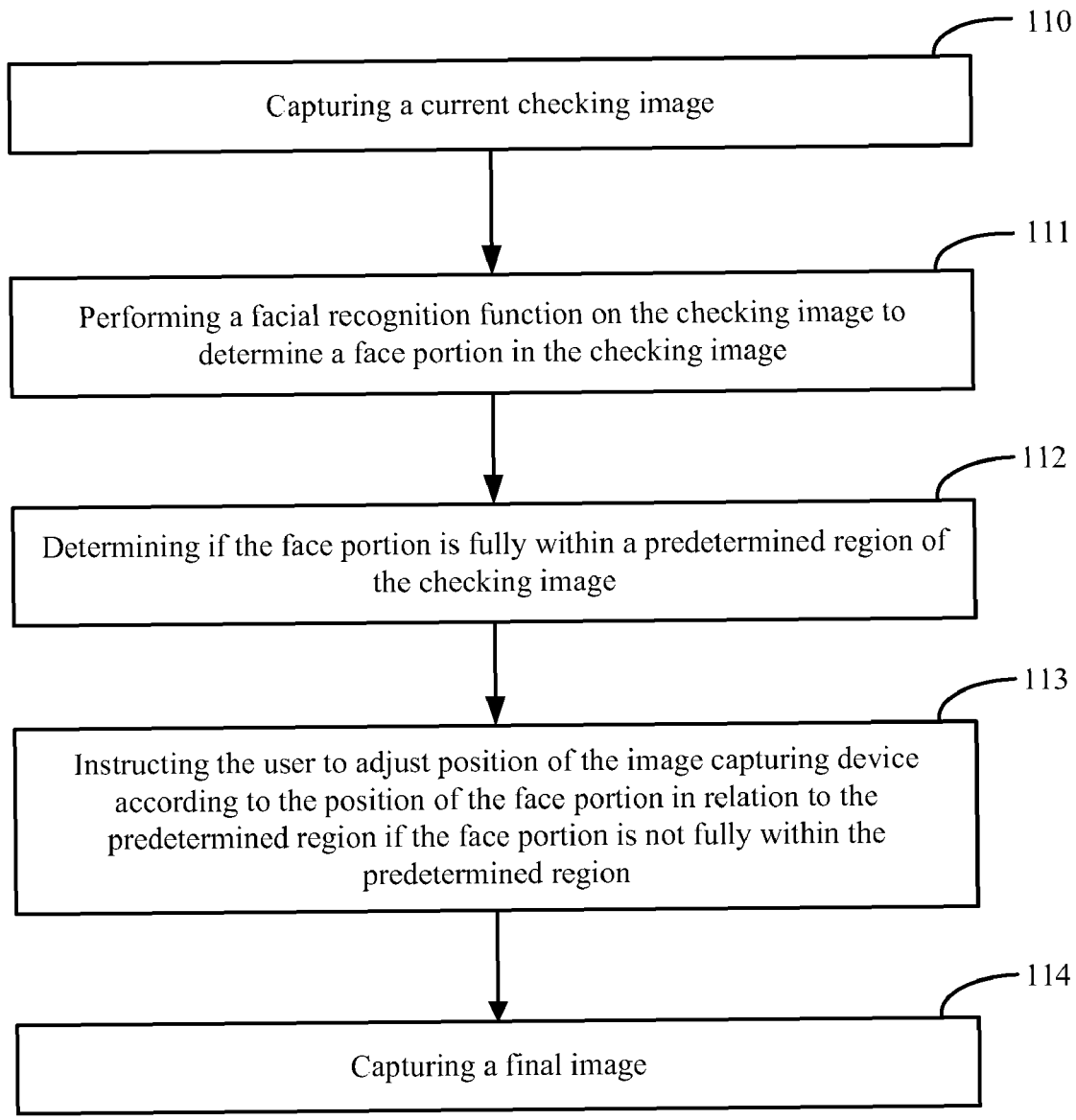
FIG. 14 is a flowchart of a guiding method for guiding a user to capture an image comprising himself.

Referring to FIG. 14, a guiding method for guiding a user to capture an image including himself includes step 110 through step 114. Step 110: capturing a current checking image. Step 111: performing a facial recognition function on the checking image to determine a face portion $10c$ in the checking image. Step 112: determining if the face portion $10c$ is fully within the predetermined region $10d$. Step 113: if the face portion $10c$ is not fully within the predetermined region $10d$, instructing the user to adjust position of the image capturing device 100, as needed, according to the position of the face portion $10c$ in relation to the predetermined region $10d$. Step 114: capturing a final image.

In summary, the image capturing device can guide the user to obtain a satisfactory image that includes himself.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An image capturing device comprising:
a memory storing a guiding system configured for guiding a user to capture an image comprising himself;
a communication unit; and
a processor configured for activating the guiding system to:
perform a facial recognition function on a current checking image to determine a face portion in the checking image;
determine if the face portion is fully within a predetermined region of the checking image; and
control communication unit to instruct the user to adjust position of the image capturing device according to the position of the face portion in relation to the predetermined region upon the condition that the face portion is not fully within the predetermined region; wherein
the predetermined region is determined by a first group of boundary coordinates in a predetermined coordinate system, the face portion being determined by a second group of boundary coordinates in the predetermined coordinate system according to face contours recognized in the image; the processor is capable of determining the position of the face portion in relation to the predetermined region by comparing the second group of boundary coordinates with the first group of boundary coordinates.

2. The image capturing device as claimed in claim 1, wherein the communication unit comprises a speaker for sending out audible messages to instruct the user.

3. The image capturing device as claimed in claim 1, wherein the communication unit comprises an array of colored LEDs for sending out visible messages to instruct the user.

4. The image capturing device as claimed in claim 1, further comprising an image sensor, the images being formed by the image sensor.

5. The image capturing device as claimed in claim 1, further comprising an optical-zoom lens unit and a lens driving unit, the lens driving unit being capable of driving the optical-zoom lens unit to a wide angle side of the optical-zoom lens unit.

6. The image capturing device as claimed in claim 1, wherein the face portion is rectangular shaped and the predetermined region is rectangular shaped.

7. The image capturing device as claimed in claim 6, wherein the communication unit is configured for being controlled to send out a first message when the area of the face portion is greater than or equal to that of the predetermined region.

8. The image capturing device as claimed in claim 6, wherein the predetermined region comprises a first side, a second side parallel to the first side, a third side perpendicularly connecting the first side to the second side, and a fourth side perpendicularly connecting the first side to the second side; the communication unit is configured for being controlled to send out a unique message if the area of the face portion is smaller than that of the predetermined region and a corresponding side of the predetermined region is partially overlapped by the face portion.

9. The image capturing device as claimed in claim 8, wherein the communication unit is configured for being controlled to send out a second message when the face portion partially overlaps with the second side of the predetermined region.

10. The image capturing device as claimed in claim 8, wherein the communication unit is configure for being controlled to send out a third message when the face portion partially overlaps with the first side of the predetermined region.

11. The image capturing device as claimed in claim 8, wherein the communication unit is configured for being controlled to send out a fourth message when the face portion partially overlaps with the third side of the predetermined region.

12. The image capturing device as claimed in claim 8, wherein the communication unit is configured for being controlled to send out a fifth message when the face portion partially overlaps with the fourth side of the predetermined region.

13. The image capturing device as claimed in claim 6, wherein the communication unit is configured for being controlled to send out a sixth message when the face portion is fully within the predetermined region.

14. The image capturing device as claimed in claim 1, wherein the processor is further configured for activating the guiding system to adjust the first group of boundary coordinates in response to a user's input.

15. The image capturing device as claimed in claim 1, further comprising a viewfinder configured for displaying the face portion and the predetermined region.

16. A guiding method for guiding a user to capture an image comprising himself using an image capturing device, comprising:
capturing a current checking image;
performing a facial recognition function on the checking image;
determining if the face portion is fully within the predetermined region;
instructing the user to adjust position of the image capturing device according to the position of the face portion in relation to the predetermined region if the face portion is not fully within the predetermined region; and
capturing the image; wherein
the predetermined region is determined by a first group of boundary coordinates in a predetermined coordinate system, the face portion being determined by a second group of boundary coordinates in the predetermined coordinate system according to face contours recognized in the image; the processor is capable of determining the position of the face portion in relation to the predetermined region by comparing the second group of boundary coordinates with the first group of boundary coordinates.

* * * * *